(12) United States Patent  
Knechtges

(10) Patent No.: US 9,199,617 B2  
(45) Date of Patent: Dec. 1, 2015

(54) TECHNIQUE FOR OPERATING A BRAKE SYSTEM IN A μ-SPLIT SITUATION

(75) Inventor: Josef Knechtges, Mayen (DE)

(73) Assignee: Lucas Automotive GmbH, Koblenz (DE)

( * ) Notice: Subject to any disclaimer, the term of this patent is extended or adjusted under 35 U.S.C. 154(b) by 93 days.

(21) Appl. No.: 13/814,000

(22) PCT Filed: Jul. 5, 2011

(86) PCT No.: PCT/EP2011/003336  
§ 371 (c)(1),  
(2), (4) Date: Mar. 21, 2013

(87) PCT Pub. No.: WO2012/016617  
PCT Pub. Date: Feb. 9, 2012

(65) Prior Publication Data  
US 2013/0207453 A1 Aug. 15, 2013

(30) Foreign Application Priority Data  
Aug. 5, 2010 (DE) .......................... 10 2010 033 496

(51) Int. Cl.  
*B60T 8/60* (2006.01)  
*B60T 8/1764* (2006.01)

(52) U.S. Cl.  
CPC .................... *B60T 8/1764* (2013.01)

(58) Field of Classification Search  
USPC .................. 303/148, 149, 186–189  
See application file for complete search history.

(56) References Cited

U.S. PATENT DOCUMENTS 6,663,113 B2 * 12/2003 Schulke et al. ............ 280/5.505  
7,775,608 B2 * 8/2010 Schmidt et al. ................ 303/148

(Continued)

FOREIGN PATENT DOCUMENTS

| CN | 1781786 A | 6/2006 |
|---|---|---|
| DE | 3925828 A1 | 2/1991 |
| DE | 10156958 A1 | 6/2002 |
| DE | 10247651 A1 | 4/2004 |
| DE | 102004011517 A1 | 10/2004 |
| DE | 102008027093 A1 | 12/2009 |
| JP | 2003220940 A | 8/2003 |
| JP | 2007331538 A | 12/2007 |
| JP | 2009096211 A | 5/2009 |

OTHER PUBLICATIONS

Chinese Search Report, Application No. 201180038247.7, dated Aug. 1, 2014.

*Primary Examiner* — Christopher Schwartz  
(74) *Attorney, Agent, or Firm* — MacMillan, Sobanski & Todd, LLC

(57) ABSTRACT

Proposed is a technique for operating a hydraulic motor vehicle brake system in an operating situation which requires the formation of a hydraulic pressure difference at opposite wheel brakes of a vehicle axle. Here, each wheel brake is assigned a first slip regulating valve device for decoupling the respective wheel brake from a hydraulic pressure generator, and a second slip regulating valve device for dissipating hydraulic pressure at the respective wheel brake. A method implementation of this technique comprises the steps of building up a hydraulic pressure at the opposite wheel brakes during the course of a braking process, detecting a requirement for forming a hydraulic pressure difference at the opposite wheel brakes, actuating one or more of the slip regulating valve devices assigned to the opposite wheel brakes so as to form the hydraulic pressure difference by virtue of different hydraulic pressures being set at the opposite wheel brakes, and, in reaction to a driver demand, increasing the hydraulic pressure at the opposite wheel brakes, including the wheel brake at which a relatively low hydraulic pressure is to be set, while maintaining the hydraulic pressure difference by transferring hydraulic fluid from the hydraulic pressure generator via the first slip regulating valve devices to the opposite wheel brakes.

20 Claims, 7 Drawing Sheets

(56) References Cited

U.S. PATENT DOCUMENTS

| | | | |
|---|---|---|---|
| 8,100,482 B2 * | 1/2012 | Kito et al. | 303/148 |
| 8,224,546 B2 | 7/2012 | Terasaka | |
| 2007/0057573 A1 * | 3/2007 | Abe | 303/148 |
| 2010/0270855 A1 * | 10/2010 | Sawada | 303/113.2 |
| 2013/0076116 A1 * | 3/2013 | Sekiya | 303/149 |

* cited by examiner

TECHNIQUE FOR OPERATING A BRAKE SYSTEM IN A µ-SPLIT SITUATION

CROSS-REFERENCE TO RELATED APPLICATIONS

This application is a national stage of International Application No. PCT/EP2011/003336 filed Jul. 5, 2011, the disclosures of which are incorporated herein by reference in entirety, and which claimed priority to German Patent Application No. DE 10 2010 033 496.0 filed Aug. 5, 2010, the disclosures of which are incorporated herein by reference in entirety.

BACKGROUND OF THE INVENTION

The invention relates generally to the field of brake systems. More precisely, the invention relates to the operation of a motor-vehicle brake system in a braking situation in which differing coefficients of friction of the road prevail on opposite sides of the vehicle (µ-split situation), or in comparable braking situations.

It is generally known that when the brakes of a motor vehicle are applied in a µ-split braking situation the vehicle has a tendency to rotate about the vertical axis of the vehicle (also called yawing). FIG. 1 illustrates this yawing in connection with a motor vehicle 10, the left wheels 12, 14 of which are running on ice, and the right wheels 16, 18 of which are running on dry asphalt.

The coefficient of static friction of ice amounts to approximately $\mu_s=0.1$, whereas the corresponding value of dry asphalt is approximately $\mu_s=0.8$. By reason of these greatly differing coefficients of friction, the wheels 12, 14 on the low-friction-coefficient side (on the left in FIG. 1) attain a state that requires a slip regulation by an anti-lock system (ABS) more quickly than the wheels 16, 18 on the high-friction-coefficient side (on the right in FIG. 1). By reason of this asymmetrical slip regulation, when the brakes of the motor vehicle 10 are applied differing braking forces act on the left wheels 12, 14 and on the right wheels 16, 18, the difference of which at the front wheels 12, 16 may be particularly strongly pronounced by reason of the dynamic axle-load shift. These differing braking forces lead, in turn, to a torque about the vertical axis 20 of the vehicle (the so-called yawing moment), and hence, under certain circumstances, to a yawing of the motor vehicle 10.

In the case of heavy motor vehicles the yawing illustrated in FIG. 1 occurs so slowly that, with slip regulation activated, it can be compensated by a driver sufficiently quickly by steering in the opposite direction. Above all in the case of lighter motor vehicles, however, measures have to be taken additionally in order to assist the driver in the course of braking in a µ-split situation.

One possibility to counteract the build-up of a yawing moment in a µ-split situation is the implementation of a so-called select-low regulation in the ABS control software. With such a regulation, in the case of a detected µ-split situation the braking force at the wheels of the rear axle is set in accordance with the ABS-regulated braking force on the low-friction-coefficient side. Whereas in the case of the select-low regulation a yawing can be very largely avoided and the controllability of the vehicle is therefore preserved well, a considerable underbraking of the wheels on the high-friction-coefficient side arises. This underbraking results in an unacceptable lengthening of the braking distance.

For this reason, in L. M. Ho et al., The Electronic Wedge Brake—EWB, XXVIth International µ Symposium 2006, pages 248f, a description is given of allowing a small difference in braking force at the opposite wheels of each axle (that is to say, between the wheels on the high-friction-coefficient side and the wheels on the low-friction-coefficient side). The braking-force difference is then gradually increased, in axle-specific manner, up to a defined value. The gradual axle-specific increase of the braking-force difference results only in a slow build-up of yawing moment. In each case the build-up of yawing moment is distinctly delayed in comparison with a 'pure' ABS regulation. The driver therefore has sufficient time to compensate a possibly resulting yawing of the vehicle by means of steering movements.

In FIG. 2 the ramp-like increase of the braking-force differences in combination with a select-low regulation is illustrated in a braking-force/time diagram according to L. M. Ho et al. In FIG. 2 it is assumed that (as represented in FIG. 1) the left side of the vehicle is the low-friction-coefficient side and the right side of the vehicle is the high-friction-coefficient side. Accordingly, at the left front and rear wheels (FL/RL in FIG. 2 and reference symbols 12 and 14 in FIG. 1) only low braking forces can be generated, whereas at the right front and rear wheels (FR/RR in FIG. 2 and reference symbols 16 and 18 in FIG. 1) distinctly higher braking forces can be built up. Overall, the braking distance in this case can be distinctly reduced in comparison with a 'pure' select-low regulation. Simultaneously, the driver is still given enough time to react to a possibly incipient yawing by steering in the opposite direction.

Now, it has turned out that in the case of the adapted select-low regulation illustrated in FIG. 2 an underbraking of the wheels on the high-friction-coefficient side still occurs. In other words, in µ-split situations the braking distance is frequently still unnecessarily long. With a view to shortening the braking distance, it is proposed in DE 10 2008 027 093 A1 to carry out a braking-force regulation in a µ-split situation with the proviso of the setting of a side-slip angle different from zero. This means that a slight yawing of the vehicle is permitted selectively. The braking-force regulation at the individual wheels is effected in this connection on the basis of a desired side-slip angle to be set within the range between 0.5° and 8°.

Conventional regulating strategies of the ABS control software in µ-split situations uncouple the driver (i.e. the brake pedal) from the braking-force regulation. For this purpose, ABS slip-regulating valves, which have been arranged between a hydraulic-pressure generator (for example, the master cylinder), on the one hand, and the wheel brakes covered by the braking force regulation, on the other hand, are closed. For the driver, the closing of the slip-regulating valves becomes noticeable in a 'hard' pedal feedback, since no more hydraulic fluid can be displaced out of the master cylinder to the wheel brakes.

In order nevertheless in the case of closed slip-regulating valves to be able to register a wish of the driver with respect to an increase in braking force, a pressure sensor for registering the master-cylinder pressure may be provided. An increase of the master-cylinder pressure registered by this pressure sensor with slip-regulating valves closed indicates a further depression of the brake pedal by the driver and can be taken into consideration in suitable manner within the scope of the ABS regulating operation.

BRIEF SUMMARY OF THE INVENTION

A feature underlying the invention is to improve the operation of a hydraulic motor-vehicle brake system in a braking situation that requires the creation of a hydraulic-pressure difference at opposite wheel brakes of a vehicle axle (that is to say, for example, in a μ-split situation).

According to a first aspect, a method is provided for operating a hydraulic motor-vehicle brake system in a braking situation that requires the creation of a hydraulic-pressure difference at opposite wheel brakes of a vehicle axle, wherein a first slip-regulating valve device for a decoupling of the respective wheel brake from a hydraulic-pressure generator and a second slip-regulating valve device for a reduction of hydraulic pressure at the respective wheel brake have been assigned to each wheel brake. The method comprises the steps of building up a hydraulic pressure at the opposite wheel brakes within the scope of a braking procedure, of registering a requirement to create a hydraulic-pressure difference at the opposite wheel brakes, of driving one or more of the slip-regulating valve devices assigned to the opposite wheel brakes for the purpose of creating the hydraulic-pressure difference by differing hydraulic pressures being set at the opposite wheel brakes, and, as a reaction to a driver request, of increasing the hydraulic pressure at the opposite wheel brakes, inclusive of the wheel brake at which a lower hydraulic pressure is to be set, while maintaining the hydraulic-pressure difference by transfer of hydraulic fluid from the hydraulic-pressure generator via the first slip-regulating valve devices to the opposite wheel brakes.

Merely the wheel brakes of one vehicle axle or alternatively the wheel brakes of several (where appropriate, of all) vehicle axles may have been covered by the increase of hydraulic pressure. Furthermore, the increase of hydraulic pressure may occur after the initial build-up of hydraulic pressure, or may be part of the initial build-up of hydraulic pressure.

At least one of the operations of the creation and maintenance of the hydraulic-pressure difference may include the step that at that one of the opposite wheel brakes at which a lower hydraulic pressure is to be set an adjustable pressure difference between the hydraulic-pressure generator and the wheel brake is brought about by means of the first slip-regulating valve device assigned to this wheel brake. Accordingly, the hydraulic pressure in a hydraulic line from the hydraulic-pressure generator to an inlet of the first slip-regulating valve device may be higher by this pressure difference than the hydraulic pressure in a hydraulic-pressure line between an outlet of the first slip-regulating valve device and the assigned wheel brake. The pressure difference at the first slip-regulating valve device may correspond to the hydraulic-pressure difference at the opposite wheel brakes or alternatively may influence it (i.e. establish it).

Upon increasing the hydraulic pressure on the inlet side of the first slip-regulating valve device an overflow of this valve device may occur while maintaining the set pressure difference. This overflow, in turn, enables an increase of hydraulic pressure also on the outlet side of the first slip-regulating valve device and hence at the wheel brake assigned to this valve device. The pressure difference can be maintained in the course of the increase of hydraulic pressure (with, where appropriate, altered magnitude).

The slip-regulating valve devices may have been designed in varying ways. Accordingly, each slip-regulating valve device may include one or more hydraulic valves and, if required, further fluid-controlling components (such as an adjustable check valve connected in parallel with the hydraulic valve). According to one realisation, at least each of the first (and—as an option—also each of the second) slip-regulating valve devices has been designed to enable a fluid connection between the hydraulic-pressure generator and the assigned wheel brake if a first pressure difference between an inlet and an outlet of the first slip-regulating valve device exceeds a predetermined maximal value, and to interrupt the fluid connection again if the excess pressure between the inlet and the outlet exceeding the predetermined maximal value has been reduced. The predetermined maximal value of the pressure difference between the inlet and the outlet of the first slip-regulating valve device may establish the hydraulic-pressure difference at the opposite wheel brakes. In other words, this maximal value may correspond to the hydraulic-pressure difference or alternatively may at least bring influence to bear thereon.

At least one of the operations of the creation and maintenance of the hydraulic-pressure difference may include the step that at that one of the opposite wheel brakes at which a higher hydraulic pressure is to be set the first slip-regulating valve device assigned to this wheel brake is kept completely open. In other words, no (additional) drop in pressure is generated at this valve device. For this purpose, for example, the predetermined maximal value for the pressure difference between the inlet and the outlet of the first slip-regulating valve device may be set to zero.

The slip-regulating valves may take the form of adjustable valve devices. The driving of the first slip-regulating valve devices and, if required, also of the second slip-regulating valve devices may happen in varying ways. Accordingly, drive signals can be generated, for example, on the basis of a pulse-width modulation or on the basis of a current regulation.

At least one of the operations of the creation and maintenance of the hydraulic-pressure difference may further include the step of the at least partial opening of the second slip-regulating valve device that has been assigned to that one of the opposite wheel brakes at which a lower hydraulic pressure is to be set. In this way the hydraulic pressure at the wheel brake assigned to this second slip-regulating valve device is accordingly reduced in order to create the hydraulic-pressure difference at the opposite wheel brakes.

The hydraulic-pressure difference may remain the same during the entire braking situation or may alternatively be altered (e.g. in accordance with the possibly changing requirements during the braking situation). Accordingly, the hydraulic-pressure difference may remain approximately the same during the increasing of the hydraulic pressure or alternatively may be maintained at an increased level (in each instance with respect to the hydraulic-pressure difference prevailing prior to the increasing of the hydraulic pressure).

At least one of the operations of the build-up of hydraulic pressure and the increase of hydraulic pressure by means of the hydraulic-pressure generator can be carried out as a reaction to an actuation of the brake pedal by the driver. The hydraulic-pressure generator may be a master cylinder coupled with the brake pedal. Alternatively or additionally to this, the hydraulic-pressure generator may also be an electrically operated hydraulic-pressure transducer unit (for example, a hydraulic pump). Consequently, the method of operation presented here may also come into operation in an electrohydraulic brake system or in a regenerative brake system (hybrid brake system).

The requirement to create a hydraulic-pressure difference at the opposite wheel brakes can be registered in various ways. Accordingly, the hydraulic-pressure difference may be created when registering a wheel-speed difference between the wheels assigned to opposite wheel brakes. Additionally or alternatively to this, an incipient yawing motion of the motor vehicle may also be registered and recognised as a requirement for creating the hydraulic-pressure difference.

The motor vehicle may comprise two or more axles. If the motor vehicle comprises a front axle and a rear axle, the increasing of the hydraulic pressure at the opposite wheel brakes can be carried out exclusively at the wheel brakes of one of the two axles (usually of the front axle). A distribution of braking force between the axles may also take place. In this case, differing hydraulic pressures may be set at the wheel brakes of the same side of the vehicle within the scope of an axle-specific braking-force distribution.

Furthermore, a computer-program product with program-code means is provided for implementing the method of operation presented here when the computer-program product is executed by a processor. The computer-program product may have been recorded on a computer-readable recording medium (for example, on a memory chip). The recording medium with the computer-program product stored thereon may be part of a control unit (electronic control unit, ECU) which also includes the processor for executing the computer-program product.

Furthermore, a hydraulic brake system of a vehicle is specified that is capable of being operated in a braking situation that requires the creation of a hydraulic-pressure difference at opposite wheel brakes of a vehicle axle. The brake system includes a hydraulic-pressure generator for the build-up of a hydraulic pressure at the opposite wheel brakes within the scope of a braking procedure, a first slip-regulating valve device for each wheel brake for the purpose of decoupling the respective wheel brake from the hydraulic-pressure generator, a second slip-regulating valve device for each wheel brake for the purpose of reducing the hydraulic pressure at the respective wheel brake, a registration device for registering a requirement to create a hydraulic-pressure difference at the opposite wheel brakes, and also a drive device for driving one or more of the slip-regulating valve devices assigned to the opposite wheel brakes for the purpose of creating the hydraulic-pressure difference by differing hydraulic pressures being set at the opposite wheel brakes. The drive device has been designed to increase, as a reaction to a driver request, the hydraulic pressure at the opposite wheel brakes, inclusive of the wheel brake at which a lower hydraulic pressure is to be set, while maintaining the hydraulic-pressure difference by transfer of hydraulic fluid from the hydraulic-pressure generator via the first slip-regulating valve devices to the opposite wheel brakes.

The first slip-regulating valve devices may have been designed to bring about an adjustable pressure difference between the hydraulic-pressure generator and the respective wheel brake—that is to say, between an inlet side and an outlet side of each valve device. Furthermore, the brake system may include an anti-lock system (ABS) to which the slip-regulating valve devices pertain. The drive device of the brake system may have been implemented as a control unit.

Other advantages of this invention will become apparent to those skilled in the art from the following detailed description of the preferred embodiments, when read in light of the accompanying drawings.

DETAILED DESCRIPTION OF THE INVENTION

In the following, various embodiments for the operation of a hydraulic motor-vehicle brake system in a braking situation that requires the creation of a hydraulic-pressure difference at opposite wheel brakes of a vehicle axle will be elucidated. These embodiments relate, merely in exemplary manner, to the μ-split braking situation illustrated in FIG. 1.

Figure 3:
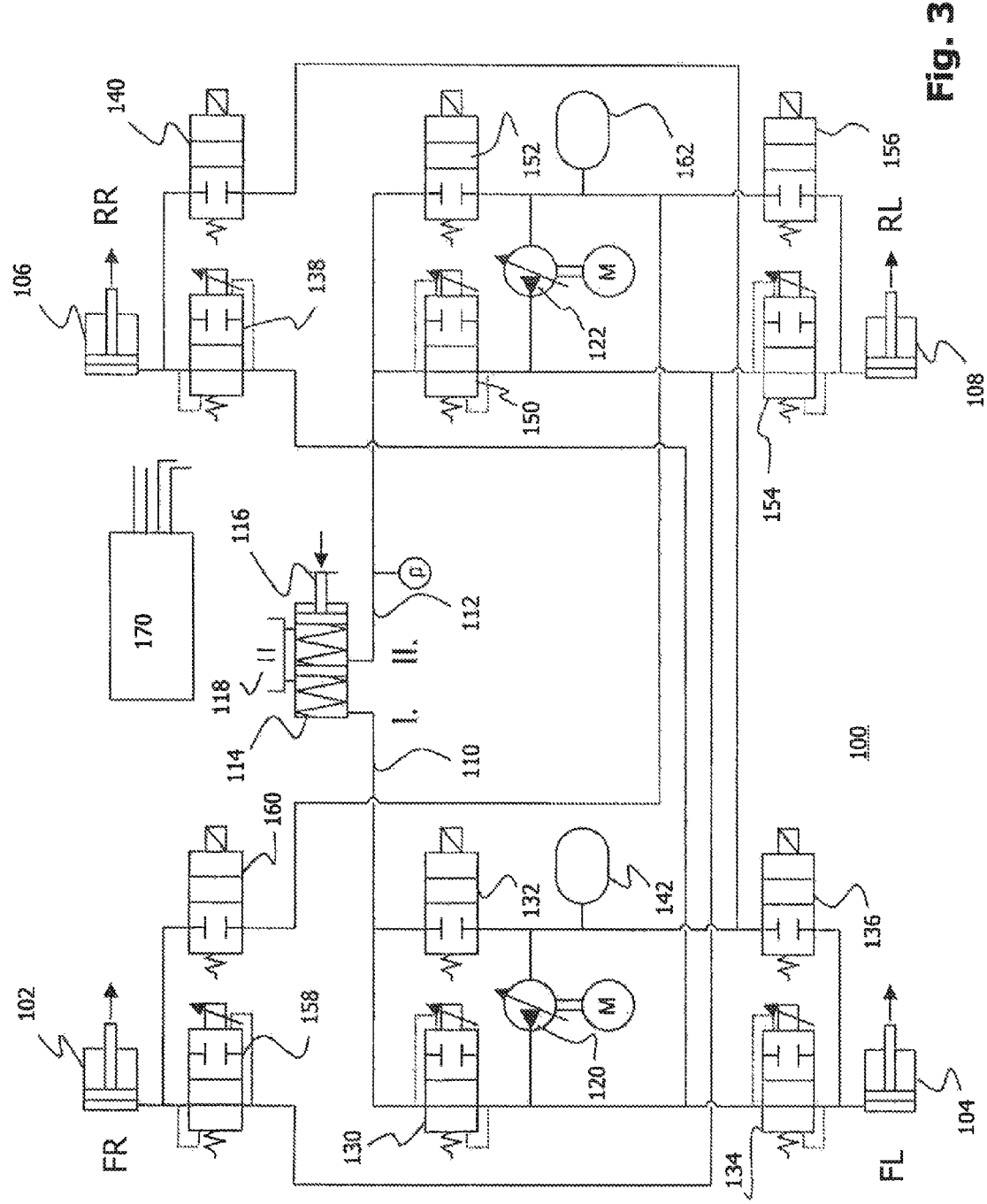
FIG. 3 is a schematic illustration of an embodiment of a motor-vehicle brake system.

FIG. 3 illustrates schematically an embodiment of a motor-vehicle brake system 100 that implements a so-called electronic stability control (ESC) and is capable of being operated in order to create a hydraulic-pressure difference at opposite wheel brakes 102, 104 and 106, 108 of a front axle and rear axle, respectively. The brake system 100 comprises two brake circuits 110, 112, the wheel brakes 102, 104, 106, 108 having been fluidically coupled with the brake circuits 110, 112 in accordance with a diagonal distribution. This means that a first brake circuit 110 supplies the wheel brake 104 at the left front wheel (FL) and also the wheel brake 106 at the right rear wheel (RR) with hydraulic fluid. A second brake circuit 112, on the other hand, supplies the wheel brake 102 at the right front wheel (FR) and also the wheel brake 108 at the left rear wheel (RL) with hydraulic fluid. Deviating from the diagonal distribution illustrated in FIG. 3, the wheel brakes 102, 104 on the front axle could be assigned to the one brake circuit 110, and the wheel brakes 106, 108 on the rear axle to the other brake circuit 112 ('black/white distribution').

The brake system 100 includes a master cylinder 114 with two hydraulic chambers which have each been assigned to one of the two brake circuits 110, 112. The master cylinder 114 has to be actuated by the driver by means of a (brake) pedal 116, whereby the actuating force introduced into the pedal 116 by the driver is ordinarily boosted—pneumatically, hydraulically or electromechanically—by a power brake unit (not represented). In the event of an actuation of the master cylinder 114, hydraulic fluid is conveyed out of a pressureless reservoir 118 via the hydraulic chambers into the two brake circuits 110, 112. The master cylinder 114 therefore constitutes a driver-actuated hydraulic-pressure generator.

The brake system 100 further includes, for each brake circuit 110, 112, a hydraulic-pressure generator that is capable of being actuated independently of the driver, in the form of, respectively, a hydraulic pump 120, 122 operated by an electric motor. Accordingly, hydraulic fluid for generating hydraulic pressure can be conveyed to the wheel brakes 102, 104, 106, 108 both by means of the master cylinder 114 and by means of the hydraulic pumps 120, 122.

In the following, the components of the first brake circuit 110 will be elucidated in more detail. It will be understood, however, that the components of the second brake circuit 112 have the same structure and the same functionality.

In the first brake circuit 110 a plurality of valve devices 130, 132, 134, 136, 138, 140 and also a pressure accumulator 142 for hydraulic fluid are arranged. The valve devices 130 to 140 are represented in FIG. 3 in their initial position, in which hydraulic fluid can be conveyed out of the master cylinder 114 to the wheel brakes 104, 106 of the left front wheel and of the right rear wheel.

The hydraulic fluid displaced out of the master cylinder 114 passes firstly through a first valve device 130. The valve device 130 is an adjustable 2/2-way valve. In the direction of build-up of hydraulic pressure downstream of the valve device 130 there has been assigned to each wheel brake 104, 106 a first slip-regulating valve device 134, 138, respectively. Each of the first slip-regulating valve devices 134, 138 corresponds in structure to valve device 130 and includes an adjustable 2/2-way valve. This 2/2-way valve has been designed to enable a fluid connection between the master cylinder 114 or the hydraulic pump 120 (inlet side) and the assigned wheel brake 104, 106 (outlet side) if a first pressure difference between the inlet side and the outlet side exceeds a predetermined maximal value, and to interrupt the fluid connection again if the excess pressure between the inlet side and the outlet side exceeding the predetermined maximal value has been reduced again. A possible realisation of the first slip-regulating valve device 134, 138 is described in DE 102 47 651 A1. The disclosure content of this document with respect to the first slip-regulating valve devices 134, 138 is included here by reference.

Each of the two first slip-regulating valve devices 134, 138 enables a decoupling of the respective wheel brake 104, 106 from the master cylinder 114 and also from the hydraulic pump 120. Such a decoupling is required, for example, during pressure-maintaining phases within the scope of an ABS regulating operation.

For the reduction of pressure at wheel brakes 104, 106 in ABS regulating operation, to each of these two wheel brakes 104, 106 a second slip-regulating valve arrangement 136, 140 in a return line leading to the pressure accumulator 142 and to the pressureless reservoir 118 has furthermore been assigned. Second slip-regulating valve devices 136, 140 include a non-adjustable 2/2-way valve (non-return valve with two switching states), which in the basic position represented in FIG. 3 is closed. In the open state of second slip-regulating valve devices 136, 140, pressurised hydraulic fluid is able to flow back from wheel brakes 104, 106 into the pressure accumulator 142. In this way, a reduction of pressure at these wheel brakes 104, 106 is effected.

The further valve device 132 provided in the return line leading to the reservoir 118 likewise includes a non-adjustable 2/2-way valve (non-return valve with two switching states) and enables a decoupling of the input side of the hydraulic pump 120 from the master cylinder 114 and from the pressureless reservoir 118. In its blocking position the hydraulic pump 120 in ABS regulating operation therefore conveys hydraulic fluid out of the pressure accumulator 142 back into brake circuit 110 or into wheel brakes 104, 106 for future pressure-build-up phases.

For automatic brake engagements, which, as a rule, occur independently of an actuation of the pedal 116 by the driver and require a decoupling of the master cylinder 114 from wheel brakes 104, 106, valve device 130 is closed and the further valve device 132 is opened. By virtue of the opening of the further valve device 132, the hydraulic pump 120 is able to withdraw hydraulic fluid from the master cylinder 114 or from the reservoir 118, so that a build-up of hydraulic pressure or an increase of hydraulic pressure at wheel brakes 104, 106 is effected by means of the hydraulic pump 120. By virtue of the closing of valve device 130, hydraulic fluid conveyed by the hydraulic pump 120 is prevented from being conveyed to the master cylinder 114 instead of to wheel brakes 104, 106.

Such automatic brake engagements include, for example, an anti-slip regulation (ASR), which prevents a spinning of individual wheels in the course of a start-up procedure by selective deceleration of a wheel involved, an electronic stability program (ESP), which adapts the behaviour of the vehicle within the limiting range to the wish of the driver and to the road conditions by selective deceleration of individual wheels, an adaptive cruise control (ACC), which by (inter alia) automatic braking maintains a spacing of the driver's own vehicle from a vehicle in front, and/or a hill descent control (HDC), which monitors and keeps constant the speed and directional stability of a vehicle when travelling downhill on loose ground or on a road with a low coefficient of friction, such as snow, inter alia by means of brake engagements.

As already elucidated above, in the second brake circuit 112 corresponding valve devices 150, 152, 154, 156, 158, 160 and a corresponding pressure accumulator 162 are located. With a view to avoiding repetition, these components will not be elucidated here in any detail.

According to FIG. 3, the brake system 100 further includes a regulating device 170, which within the scope of an ABS regulating operation and, in particular, in a μ-split braking situation automatically intervenes in a braking procedure. The regulating device 170 is, inter alia, provided for the purpose of driving all the valve arrangements 130 to 140 and 150 to 160 and also the hydraulic pumps 120, 122.

Figure 4:
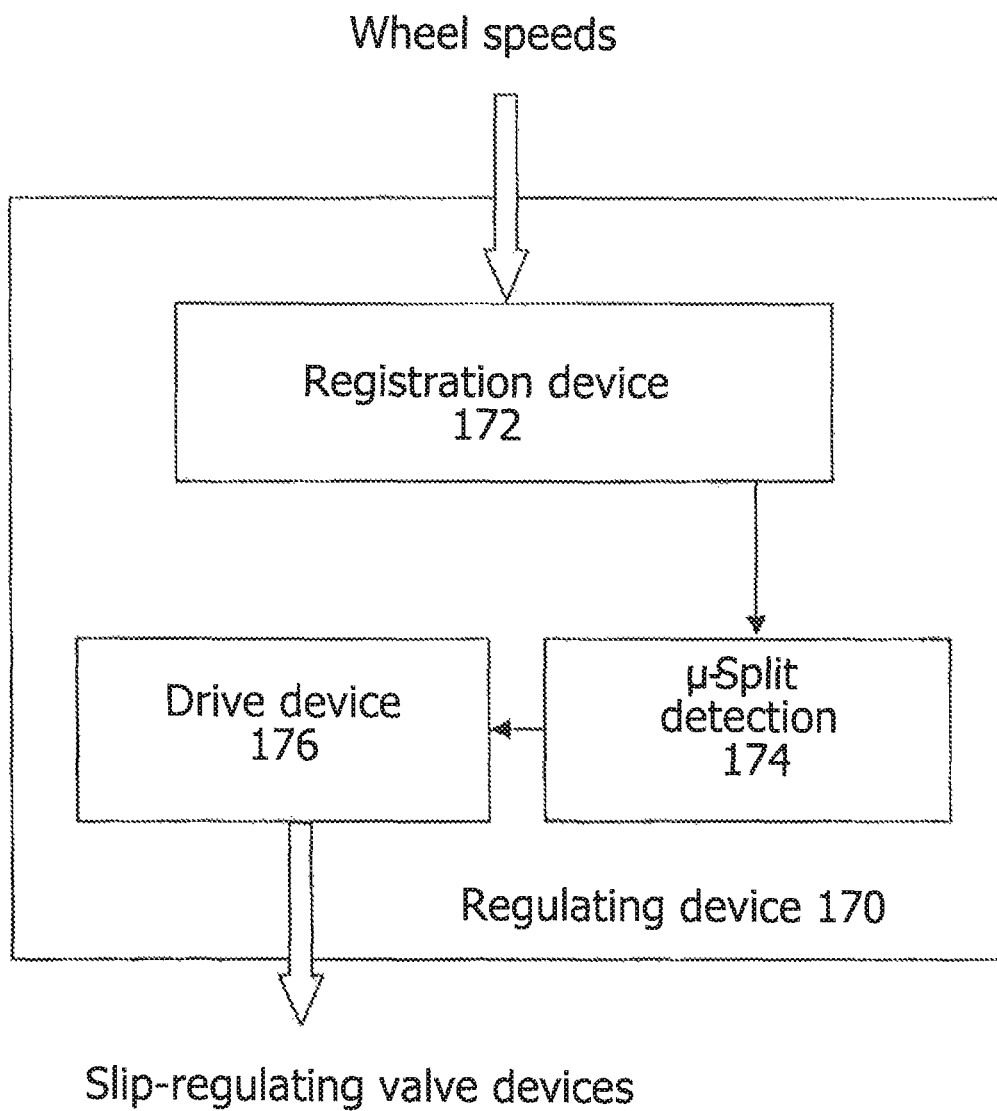
FIG. 4 is a schematic representation of a regulating device of the motor-vehicle braking system according to FIG. 3.

As represented in FIG. 4, the regulating device 170 includes a registration device 172 for registering a requirement to create a predetermined hydraulic-pressure difference at opposite wheel brakes 102, 104, and 106, 108. The registration device 172 may, for example, include wheel-speed sensors. The regulating device 170 further possesses a device 174 for μ-split detection. Device 174 receives wheel-speed signals from the registration device 172 and detects a μ-split situation if a wheel-speed difference between the wheels that have been assigned to the wheel brakes 102, 104 of the front axle and to the wheel brakes 106, 108 of the rear axle exceeds a predetermined threshold value. If device 174 establishes an exceeding of the threshold value, this is signalled to a drive device 176 of the regulating device 170. The drive device 176 has been designed to drive the slip-regulating valve devices 134, 136, 138, 140, 154, 156, 158, 160 in suitable manner in order to counteract the creation of a yawing moment in the detected μ-split situation, or at least to limit the build-up of the yawing moment.

In the following, the modes of operation of the brake system 100 according to FIG. 3 and, in particular, of the regulating device 170 according to FIG. 4 will be elucidated in more detail with reference to the flow chart 500 according to FIG. 5 and also the exemplary hydraulic-pressure curves according to FIGS. 6 and 7.

Figure 5:
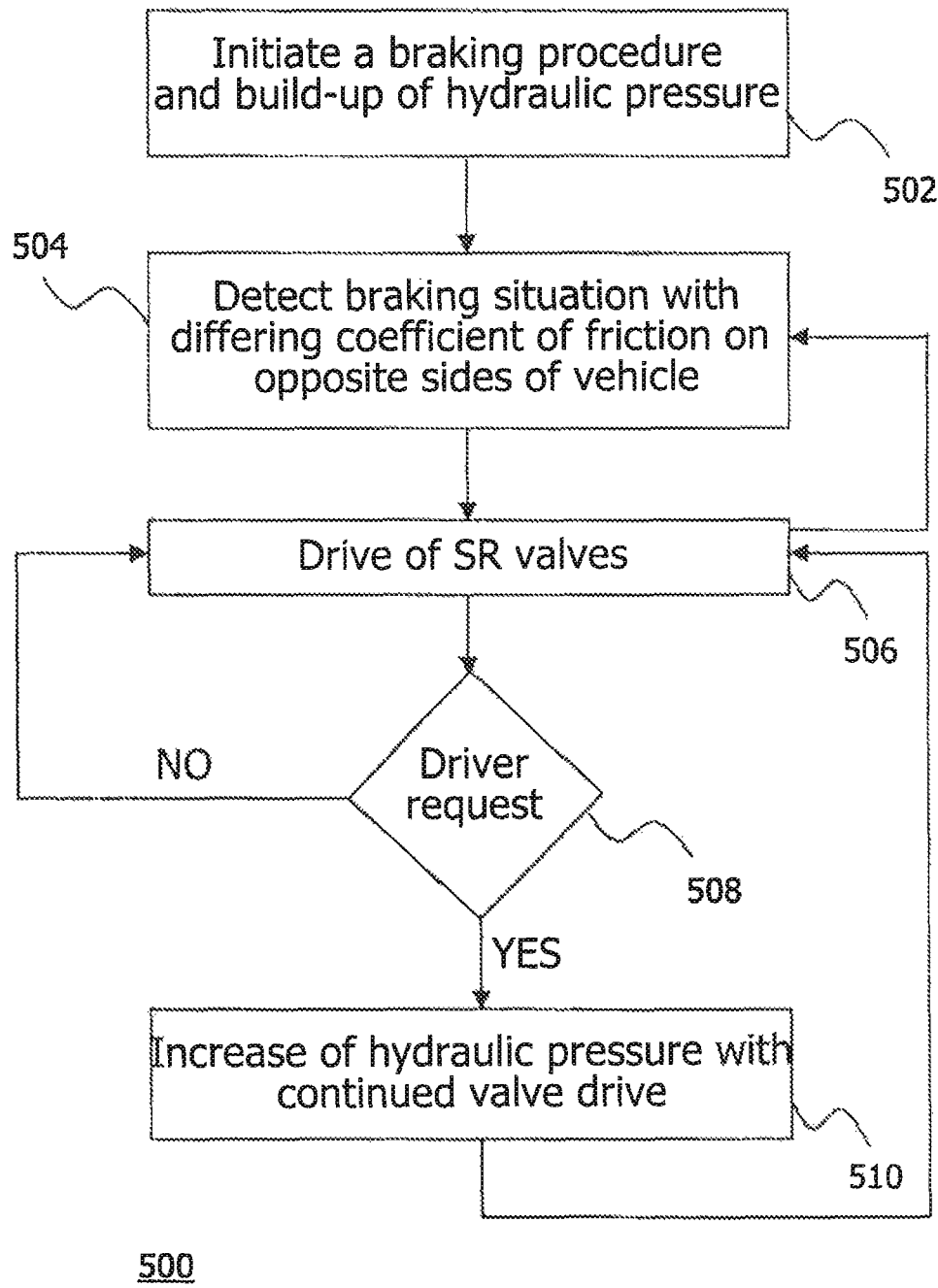
FIG. 5 is a schematic flow chart which illustrates an embodiment of a method of operation for the brake system according to FIG. 3 in a μ-split situation.

The method of operation of the brake system 100 in a μ-split situation, represented in FIG. 5, begins in step 502 with the initiating of a braking procedure by the driver. As a consequence of an actuation of the brake pedal in this case, a hydraulic pressure is built up by means of the master cylinder 114 in the two brake circuits 110, 112. All the valve devices of the brake system 100 are located in their initial position illustrated in FIG. 3. For this reason, the pressurised hydraulic fluid displaced out of the master cylinder 114 is able to reach the wheel brakes 102, 104, 106, 108.

Figure 6:
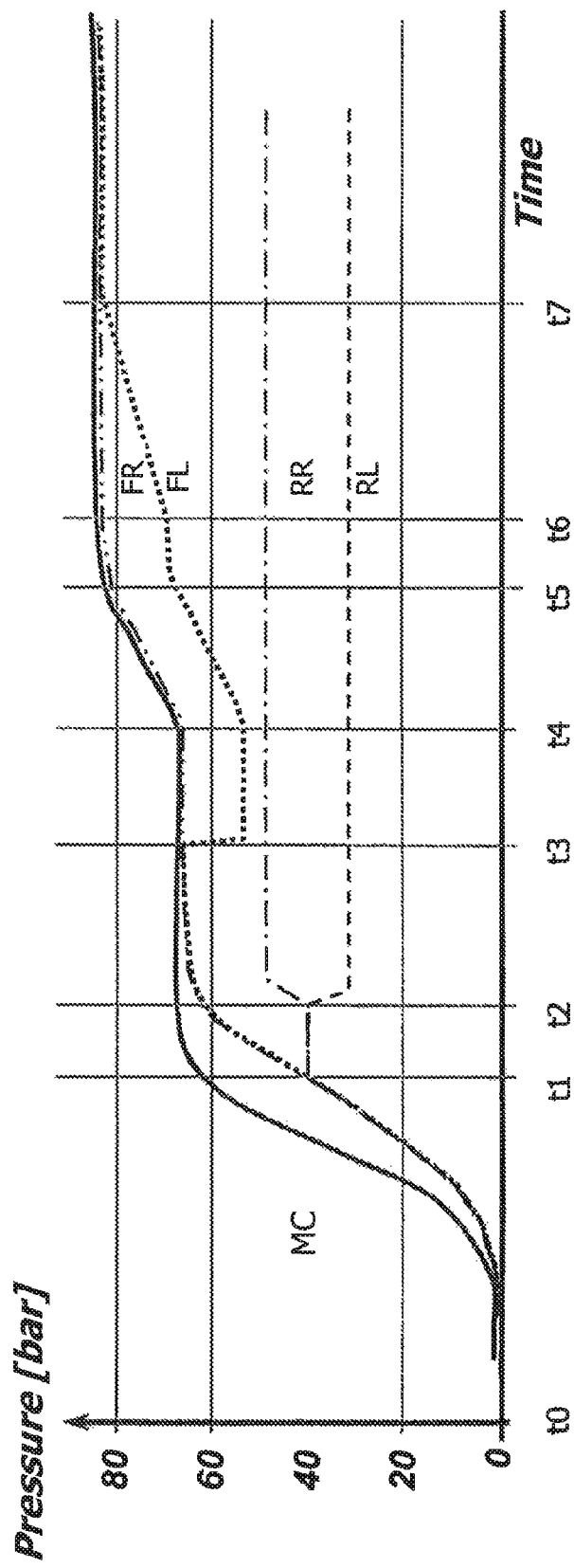
FIGS. 6 and 7 are schematic hydraulic-pressure curves for differing pressure-increase scenarios.

The hydraulic-pressure curves in the master cylinder (MC) 114 and also at the wheel brakes 102, 104, 106 and 108 (FR, FL, RR, RL) are illustrated in FIG. 6. In this connection it becomes evident that at the start of the braking procedure (time t0 until time t1) a uniform build-up of hydraulic pressure occurs at all four wheel brakes 102, 104, 106, 108. The build-up of hydraulic pressure at the wheel brakes 102, 104, 106, 108 in this case lags somewhat behind the build-up of hydraulic pressure in the master cylinder 114, because the rise in pressure in the master cylinder 114, as shown in FIG. 6, occurs very quickly.

In the present embodiment, upon a hydraulic-pressure threshold being attained at the wheel brakes 102, 104, 106, 108 at time t1 a braking-force distribution occurs between the wheel brakes 106, 108 of the rear axle and the wheel brakes 102, 104 of the front axle. More precisely, at the wheel brakes 102, 104 of the front axle a higher hydraulic pressure is permitted than at the wheel brakes 106, 108 of the rear axle. This procedure is also designated as dynamic rear proportioning (DRP) or as dynamic braking-force distribution.

Figure 1:
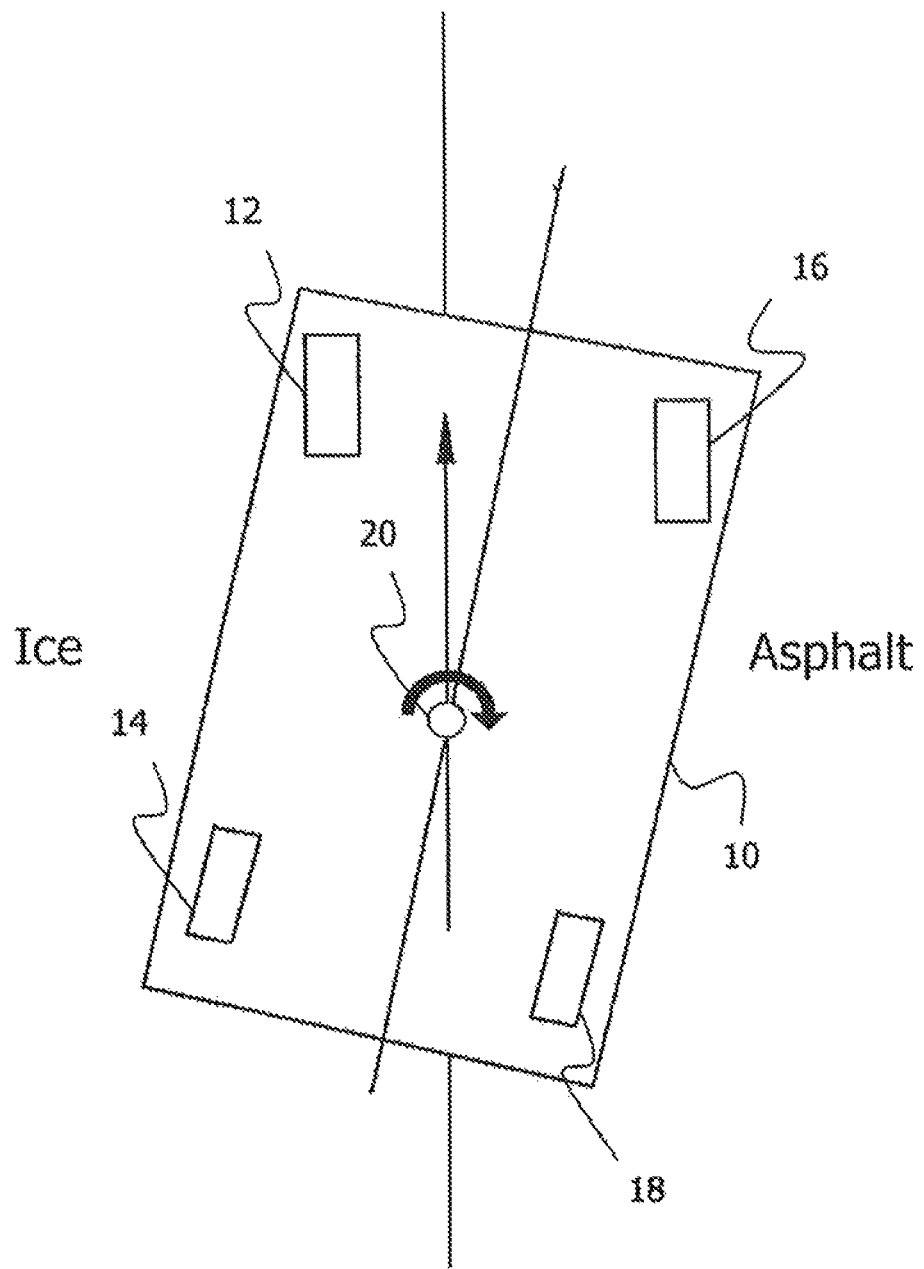
FIG. 1 is a schematic illustration of the yawing of a motor vehicle in a μ-split situation.
Figure 2:
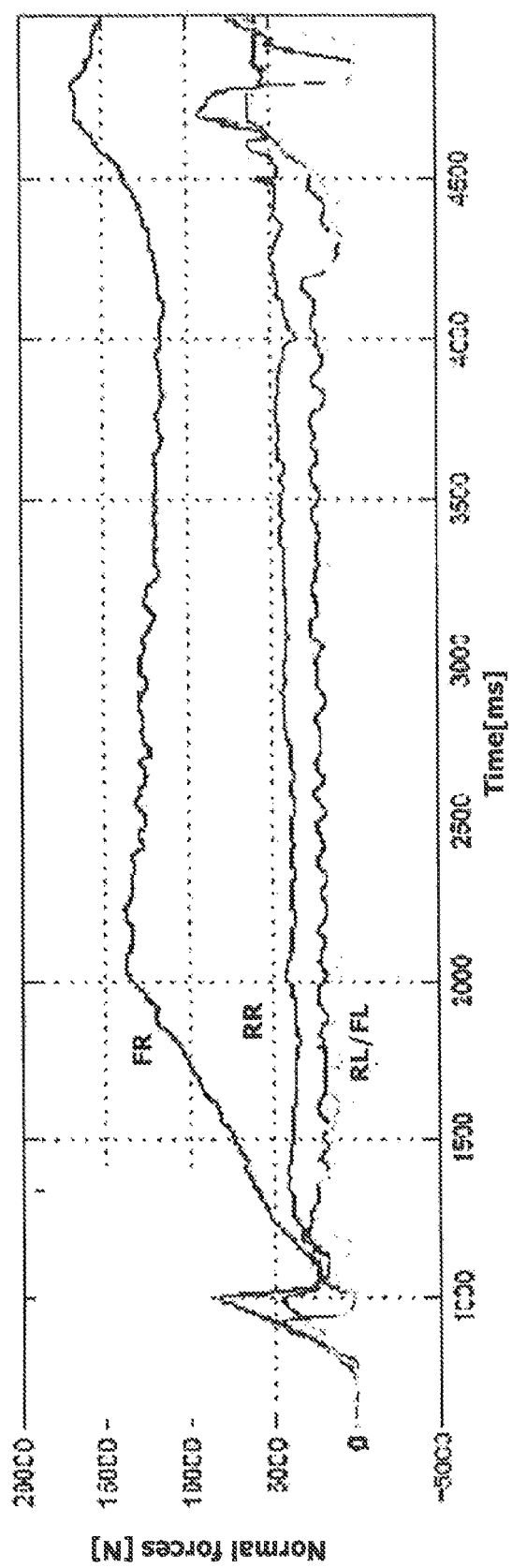
FIG. 2 is a schematic diagram of a select-low regulation with ramp-like increase of pressure difference according to the state of the art.

During the build-up of hydraulic pressure it is continuously ascertained by the regulating device 170 whether a braking situation has arisen that necessitates the creation of a hydraulic-pressure difference between the wheel brakes 102, 104 of the front axle or the wheel brakes 106, 108 of the rear axle by reason of a difference of coefficient of friction (μ-split situation; cf. FIG. 1). In this connection, the wheel speeds of axle-specifically opposite wheels ascertained by the registration device 172 are continuously compared with one another by the device 174 for μ-split detection. If device 174 detects the exceeding of a threshold value, below which differences in wheel speed are still considered to be permissible, a μ-split situation—that is to say, a braking response with differing coefficient of friction on opposite sides of the vehicle—is detected by device 174. This state of affairs corresponds to step 504 in FIG. 5.

In connection with the μ-split detection, for the rear axle and the front axle differing threshold values for the wheel-speed difference can be predetermined. In this way, the threshold value for the wheels of the rear axle can be set to be smaller than the threshold value for the wheels of the front axle, since—by reason of the dynamic axle-load shift from the rear axle to the front axle resulting in the course of deceleration of the vehicle—at the wheels of the front axle a higher braking force can be applied up until the onset of the ABS slip regulation. This has the result that a μ-split situation is detected earlier (time t2) at the wheels of the rear axle than at the wheels of the front axle (time t3).

After detection in step 504 of a safety-relevant μ-split situation, which requires an automatic intervention in the braking procedure, in step 506 a drive of the slip-regulating valve devices involved is effected by means of the drive device 176. As illustrated in FIG. 6, this drive begins at time t2 at the rear axle, and at time t3 at the front axle.

As far as the rear axle is concerned, within the scope of the DRP at time t1 the hydraulic pressure at both wheel brakes 106, 108 of the rear wheels is kept constant. This is done by closing the two assigned first slip-regulating valve devices 138, 154. By reason of the μ-split situation, at time t2 a build-up of hydraulic pressure at the wheel brake 106 of the right rear wheel begins, and also a simultaneous reduction of hydraulic pressure at the wheel brake 108 of the left rear wheel. The reduction of hydraulic pressure at wheel brake 108 is effected by brief opening and subsequent closing of second slip-regulating valve device 156. The build-up of hydraulic pressure at wheel brake 106 may be effected by brief opening and subsequent closing of first slip-regulating valve device 138, since the master-cylinder pressure (MC) is at a higher level than the hydraulic pressure (RR, RL) to be set at wheel brakes 106, 108. As illustrated in FIG. 6, the pressure difference that has been set in this way can be retained continuously.

The pressure differences that have been set at the wheel brakes 106, 108 of the rear axle have been chosen in this case in such a way that a desired hydraulic-pressure difference between these wheel brakes 106, 108 and an accompanying braking-force difference arise. This braking-force difference counteracts a rapid rise in the yawing moment and hence influences the stability of the vehicle positively.

As already mentioned, the creation of a hydraulic-pressure difference, enhancing the stability of the vehicle, at the wheel brakes 102, 104 of the front axle occurs only at a later time t3, since on the front axle a higher wheel-speed difference can be permitted. At time t3 a reduction of hydraulic pressure then happens at the wheel brake 104 of the left front wheel to such an extent that the desired hydraulic-pressure difference in relation to the wheel brake 102 of the right front wheel is set. For this purpose, the second slip-regulating valve device 136 assigned to the left front wheel is briefly opened, in order that a reduction of hydraulic pressure can occur. Subsequently thereto or simultaneously therewith, the first slip-regulating valve device 134 assigned to the left front wheel has applied to it by the drive device 176 a drive signal, based on a pulse-width modulation and/or current regulation (closing current), that corresponds to a precisely defined valve-closing force and accordingly to a desired pressure difference between an inlet side and an outlet side of slip-regulating valve device 134. This pressure difference between the inlet side and the outlet side of slip-regulating valve device 134 tallies with the hydraulic-pressure difference between the wheel brake 102 of the right front wheel and the wheel brake 104 of the left front wheel, since the master-cylinder pressure applied at the inlet of the first slip-regulating valve device 134 of wheel brake 104 is also applied directly at the wheel brake 102 of the right front wheel (cf. FIG. 6). This is because the first slip-regulating valve device 158 assigned to the wheel brake 102 of the right front wheel is held by the drive device 176 in a maximally conducting state.

As long as the master-cylinder pressure remains constant (between times t3 and t4), the hydraulic-pressure difference at the opposite wheel brakes 102, 104 and 106, 108 of the front and rear axles, respectively, also remains constant. In this case it is assumed that the corresponding wheel-speed differences (and hence the coefficients of friction of the road) do not change significantly.

At time t4, in step 508 an increase of the hydraulic pressure is then requested by the driver. This request can be effected, for example, by further depression of the brake pedal, this becoming noticeable, starting from time t4, in a rise of the master-cylinder pressure (step 510) up until a time t5. Since the first slip-regulating valve device 158 assigned to the wheel brake 102 at the right front wheel continues to be held in the maximally open state by the drive device 176, the hydraulic pressure at wheel brake 102 follows the master-cylinder pressure directly (cf. FIG. 6). Since, furthermore, the drive device 176 continues to drive the first slip-regulating valve device 134 assigned to the wheel brake 104 at the left front wheel with regard to maintaining a predetermined pressure difference between inlet side and outlet side, the pressure at wheel brake 104 also follows the rise in hydraulic pressure in the master cylinder 114, though reduced by the set pressure difference.

The rise in hydraulic pressure at wheel brake 104 between times t4 and t5 is connected with the fact that the first slip-regulating valve device 134 assigned to this wheel brake 104 enables the fluid connection between the master cylinder 114 and wheel brake 104 as soon as a pressure difference between an inlet side and an outlet side of this valve device 134 exceeds the pressure difference predetermined by the drive device 176 (by means of current regulation or pulse-width modulation). When the predetermined pressure difference is exceeded, a transfer of hydraulic fluid from the master cylinder 114 via first slip-regulating valve device 134 to wheel brake 104 occurs. Since the second slip-regulating valve device 136 assigned to wheel brake 104 remains closed, an increase of hydraulic pressure at wheel brake 104 therefore arises. First slip-regulating valve device 134 has been designed in such a manner that the fluid connection from the master cylinder to wheel brake 104 is interrupted again immediately if the excess pressure exceeding the predetermined differential pressure between its inlet side and outlet side has been reduced again. First slip-regulating valve device 134 therefore works like a pressure-relief valve with adjustable overflow pressure.

Starting from time t5, the further depression of the brake pedal comes to an end, and the rise in hydraulic pressure in the master cylinder 114 levels out correspondingly. Hence the increase of hydraulic pressure (step 510) ends with continued valve drive. At a time t6 an end of the µ-split situation is finally detected by device 174 (for example, by wheel-speed differences on the front and rear axles falling). Thereupon a reduction of the hydraulic-pressure differences between the wheel brakes 102, 104 of the front axle is initiated by the drive device 176. This reduction of hydraulic pressure is concluded at a time t7, so that, starting from this time, an automatic intervention in the braking procedure occurs merely by reason of the DRP (braking-force distribution). Not represented in any detail is the fact that for the purpose of reducing the hydraulic-pressure differences at the wheel brakes 106, 108 of the rear axle the hydraulic pressure in the wheel brake 108 of the left rear wheel can again be set to the pressure level in the wheel brake 106 of the right rear wheel (cf. FIG. 7) by the drive device 176 by suitable pulse-width modulation and/or current regulation of first slip-regulating valve device 154.

In the embodiment represented in FIG. 6 it is assumed that the µ-split situation arises only after a master-cylinder target pressure predetermined by means of the brake-pedal position has been attained. FIG. 7 illustrates another embodiment, in which the µ-split situation arises during a comparatively slow build-up of hydraulic pressure in the master cylinder. As a comparison of FIGS. 6 and 7 shows, the build-up of hydraulic pressure in the master cylinder 114 in the embodiment according to FIG. 7 occurs so slowly that the hydraulic pressures at the wheel brakes 102, 104, 106, 108 follow the hydraulic pressure in the master cylinder 114 practically instantaneously.

Figure 7:
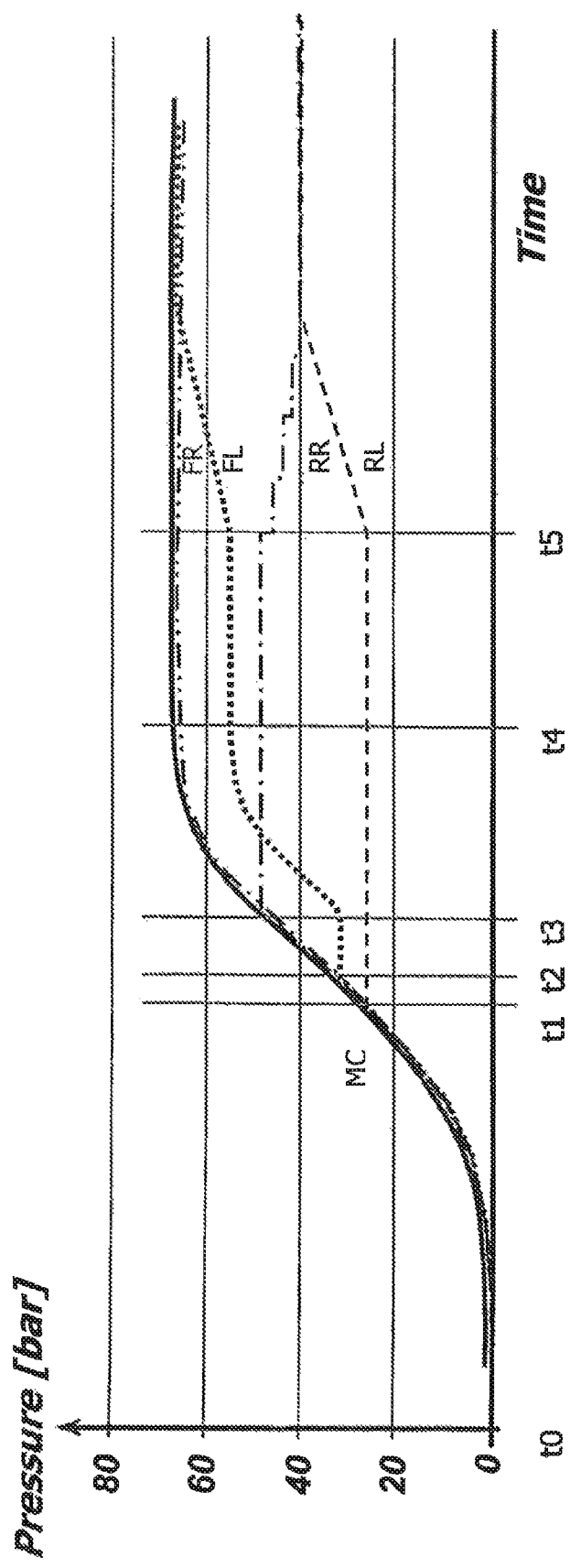

According to FIG. 7, at time t1 a µ-split situation and also a DRP regulation occur simultaneously at the wheel brakes 106, 108 of the rear axle. Consequently, the build-up of a hydraulic-pressure difference between the wheel brake 108 of the left rear wheel and the wheel brake 106 of the right rear wheel begins at the same time as the creation of a hydraulic-pressure difference between the wheel brakes 102, 104 of the front axle and the wheel brakes 106, 108 of the rear axle. The drive of the first slip-regulating valve devices 138, 154 on the rear axle is effected in this connection substantially as elucidated in connection with the embodiment represented in FIG. 6. Deviating from this embodiment, however, no lowering of the hydraulic pressure is required. For this reason, second slip-regulating valve devices 140, 156 remain closed.

At a later time t2 the µ-split situation is detected also with regard to the wheel brakes 102, 104 of the front axle. Accordingly, as already described above with reference to FIG. 6, the first slip-regulating valve device 134 assigned to the wheel brake 104 of the left front wheel has a drive signal applied to it by the drive device 176, by means of pulse-width modulation or current regulation, that corresponds to the desired differential pressure between the wheel brake 104 of the left front wheel and the wheel brake 102 of the right front wheel. In contrast to the embodiment according to FIG. 6, a reduction of hydraulic pressure is once again not required.

Starting from time t2, the driver continues to demand an increase of hydraulic pressure. Accordingly, the hydraulic pressure at the wheel brake 102 of the right front wheel increases further, whereas the hydraulic pressure of the wheel brake 104 of the left front wheel is kept constant until, at time t3, the hydraulic-pressure difference between the two wheel brakes 102, 104 of the front axle has attained the hydraulic-pressure difference predetermined by the drive device 176. Starting from this time t3, a further increase of the hydraulic pressure upon further depression of the brake pedal leads to a parallel rise in hydraulic pressure at the wheel brakes 102, 104 of the front axle while retaining the hydraulic-pressure difference predetermined by the drive device 176. As illustrated in FIG. 7, this hydraulic-pressure difference is furthermore maintained even when, at time t4, no further increase of the hydraulic pressure in the master cylinder 114 arises—that is to say, the master-cylinder target pressure has been attained.

At a time t5, device 174 finally detects a cessation of the µ-split situation. Starting from this time t5, the hydraulic pressure in wheel brake 104 is therefore increased by the drive device 176 until a hydraulic-pressure difference between the wheel brakes 102, 104 of the front axle has been reduced again. Likewise, the hydraulic pressures in wheel brakes 106, 108 are reduced or increased by the drive device 176 until a hydraulic-pressure difference between the wheel brakes 106, 108 of the rear axle has been reduced again.

As follows from the embodiments, the method of operation described here permits a totally safe hydraulic-pressure regulation, in the course of which an increase of pressure by the driver is guaranteed at any time. The driver can therefore overstep a pressure difference that has been set at the first slip-regulating valve devices 134, 138 at any time. For this reason, the 'hard' pedal feedback which is familiar from the state of the art ceases to apply. The measurement of the wish of the driver by a (additional) pressure sensor for registering the master-cylinder pressure within the scope of a µ-split situation is also superfluous. The method of operation presented here can be employed in axle-specific manner and displays good effectiveness, above all, on the front axle by reason of the regularly higher wheel load there and the good brake parameters. For this reason, the method of operation proposed here can also be combined in outstanding manner with DRP mechanisms.

The method of operation proposed here is capable of being employed both in ESC or ESP brake systems and in brake systems that merely implement an ABS functionality. This applicability arises, above all, from the fact that the pressure-regulating strategies presented here are capable of being implemented, if required, exclusively by means of the ABS slip-regulating valve devices. Furthermore, the pressure-regulating strategies can be implemented in straightforward manner in the ABS regulating software and in a corresponding control unit. The regulating device 170 illustrated in FIG. 4 can therefore be integrated at least partly into an ABS control unit.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method for operating a hydraulic motor-vehicle brake system in a braking situation that requires the creation of a hydraulic-pressure difference at opposite left and right front and/or rear wheel brakes arranged oppositely to one another on a front and/or rear vehicle axle, wherein a first slip-regulating valve device for a decoupling of a respective wheel brake from a hydraulic-pressure generator and a second slip-regulating valve device for a reduction of hydraulic pressure at the respective wheel brake have been assigned to each of the opposite wheel brakes, comprising the following steps:

building up a hydraulic pressure at the opposite wheel brakes within a braking procedure;

registering a requirement to create a hydraulic-pressure difference at the opposite wheel brakes;

driving one or more of the slip-regulating valve devices assigned to the opposite wheel brakes for the purpose of creating the hydraulic-pressure difference by differing hydraulic pressures being set at the opposite wheel brakes; and, as a reaction to a driver request, increasing the hydraulic pressure at one of the opposite wheel brakes, inclusive of the other one of the opposite wheel brakes at which a lower hydraulic pressure is to be set, while maintaining the hydraulic-pressure difference by transfer of hydraulic fluid from the hydraulic-pressure generator via the first slip-regulating valve device to the opposite wheel brakes.

2. The method according to claim 1, wherein at least one of the operations of the creating and maintaining of the hydraulic-pressure difference includes the step that at that the other one of the opposite wheel brakes at which a lower hydraulic pressure is to be set a pressure difference between the hydraulic-pressure generator and the other one of the opposite wheel brakes is set by means of the first slip-regulating valve device assigned thereto.

3. The method according to claim 1, wherein the first slip-regulating valve device enables a fluid connection between the hydraulic-pressure generator and the assigned wheel brake if a first pressure difference between an inlet and an outlet of the first slip-regulating valve device exceeds a predetermined maximal value, and interrupts the fluid connection if the excess pressure between the inlet and the outlet exceeding the predetermined maximal value has been reduced.

4. The method according to claim 3, wherein the predetermined maximal value of the pressure difference between the inlet and the outlet of the first slip-regulating valve device establishes the hydraulic-pressure difference.

5. The method according to claim 1, wherein at least one of the operations of the creating and maintaining of the hydraulic-pressure difference includes the step that at that the one of the opposite wheel brakes at which a higher hydraulic pressure is to be set the first slip-regulating valve device assigned thereto is kept completely open.

6. The method according to claim 1, wherein the driving of at least the first slip-regulating valve devices is effected by means of pulse-width modulation or current regulation.

7. The method according to claim 1, wherein at least one of the operations of the creating and maintaining of the hydraulic-pressure difference includes the step of the at least partial opening of the second slip-regulating valve device that has been assigned to the other one of the opposite wheel brakes at which the lower hydraulic pressure is to be set.

8. The method according to claim 1, wherein during the increasing of the hydraulic pressure the hydraulic-pressure difference is maintained at approximately the same level or at an increased level.

9. The method according to claim 1, wherein at least one of the operations of the build-up of hydraulic pressure and the increase of hydraulic pressure is carried out by means of the hydraulic-pressure generator as a reaction to an actuation of the brake pedal by the driver.

10. The method according to claim 1, wherein the hydraulic-pressure difference is created when registering a difference in wheel speed between wheels assigned to the opposite wheel brakes.

11. The method according to claim 1, wherein the increasing of the hydraulic pressure at the opposite wheel brakes is carried out exclusively at the opposite wheel brakes of one of the two axles.

12. The method according to claim 1, wherein at the wheel brakes of the same side of the vehicle differing hydraulic pressures are set within the scope of an axle-specific braking-force distribution.

13. A computer-program product with program-code means for implementing the method according to claim 1 when the computer-program product is executed by a processor.

14. The computer-program product according to claim 13, stored on a computer-readable recording medium.

15. A control unit including the recording medium with the computer-program product according to claim 14 stored thereon.

16. A hydraulic motor-vehicle brake system that is capable of being operated in a braking situation that requires the creation of a hydraulic-pressure difference at opposite left and right front and/or rear wheel brakes arranged oppositely to one another on a front and/or rear vehicle axle, comprising:

a hydraulic-pressure generator for the build-up of a hydraulic pressure at the opposite wheel brakes within a braking procedure;

a first slip-regulating valve device for each of the opposite wheel brakes for the purpose of decoupling a respective wheel brake from the hydraulic-pressure generator;

a second slip-regulating valve device for each of the opposite wheel brakes for the purpose of reducing the hydraulic pressure at the respective wheel brake;

a registration device for registering a requirement to create a hydraulic-pressure difference at the opposite wheel brakes; and a drive device for driving one or more of the slip-regulating valve devices assigned to the opposite wheel brakes for the purpose of creating the hydraulic-pressure difference by differing hydraulic pressures being set at the opposite wheel brakes, the drive device having been designed to increase, as a reaction to a driver request, the hydraulic pressure at one of the opposite wheel brakes, inclusive of the other one of the opposite wheel brakes at which a lower hydraulic pressure is to be set, while maintaining the hydraulic-pressure difference by transfer of hydraulic fluid from the hydraulic-pressure generator via the first slip-regulating valve devices to the opposite wheel brakes.

17. The brake system according to claim 16, wherein the first slip-regulating valve devices have been designed to bring about an adjustable pressure difference between the hydraulic-pressure generator and the respective wheel brake.

18. The brake system according to claim 16, further including an anti-lock system, wherein the slip-regulating valve devices pertain to the anti-lock system.

19. The brake system according to claim 16, wherein at least each of the first slip-regulating valve devices has been designed to enable a fluid connection between the hydraulic-pressure generator and the assigned wheel brake if a first pressure difference between an inlet and an outlet of the first slip-regulating valve device exceeds a predetermined maximal value, and to interrupt the fluid connection again if the excess pressure between inlet and outlet exceeding the predetermined maximal value has been reduced again.

20. The brake system according to claim 16, wherein the drive device is implemented in a control unit.

* * * * *